United States Patent [19]

Wilwerding

[11] Patent Number: 4,912,337

[45] Date of Patent: Mar. 27, 1990

[54] POSITION RESPONSIVE APPARATUS

[75] Inventor: Dennis J. Wilwerding, Arapahoe, Colo.

[73] Assignee: Honeywell Inc., Minneapolis, Minn.

[21] Appl. No.: 202,074

[22] Filed: Jun. 3, 1988

[51] Int. Cl.⁴ .............................................. G01N 21/86
[52] U.S. Cl. ..................................... 250/560; 250/561; 250/223 B; 356/387
[58] Field of Search ..................... 250/560, 561, 223 B, 250/223 R; 356/383-387

[56] References Cited

U.S. PATENT DOCUMENTS

| | | | |
|---|---|---|---|
| 3,055,834 | 10/1977 | Planke | 250/223 B |
| 3,529,169 | 9/1970 | Heaney et al. | 250/223 B |
| 3,955,179 | 5/1976 | Planke | 250/223 B |
| 4,166,949 | 9/1979 | Pöld et al. | 250/223 B |
| 4,259,571 | 3/1981 | Dubberly | 250/223 B |

Primary Examiner—David C. Nelms
Assistant Examiner—Khaled Shami
Attorney, Agent, or Firm—Charles J. Ungemach

[57] ABSTRACT

Position responsive apparatus for determining the proper characteristics of an object within its field of view utilizing a pair of crossed detector arrays, one of which operates to detect the position of an image of the object as it moves in a first direction with respect to a first of the arrays and the other of which observes the desired characteristic of the object at successive positions of the image.

25 Claims, 3 Drawing Sheets

POSITION RESPONSIVE APPARATUS

BACKGROUND OF THE INVENTION

1. Field of the Invention

The present invention relates to an optical system for viewing an object and for detecting certain aspects relating thereto such as the extent of its dimensions in two directions.

2. Description of the Prior Art

It is often desirable to determine the characteristics of an object in order to obtain information, for example, concerning its shape or its orientation with respect to a background. In the art of labelling, containers such as bottles having irregular shapes often have labels fastened thereon which also may be of irregular shape and it is desirable to be able to determine that the label is in a proper position with respect to the bottle. One way of determining whether the label is in the correct position is to observe the bottle and the label with a plurality of radiation responsive detectors which will produce individual outputs dependent upon whether the bottle or the label is in the field of view with respect to a background. In the prior art, bottles with labels affixed thereto have been moved along a conveyor belt so as to pass a linear array of detectors which are mounted adjacent the conveyor belt, usually perpendicular to the bottle motion. The image of the moving bottle is directed on to the detectors so that the outputs of the detectors will change when the bottle comes into the field of view and then change again when the label comes into the field of view, thus giving a one-dimensional indication of the extent of the bottle and label because the detectors, being spaced vertically, will be activated by the bottle and the label so that it can be determined from the number of detectors that are activated, what the vertical dimensions of the bottle and label are. Of course, it is desirable to determine the vertical dimensions of the bottle and label at a plurality of horizontal positions in order to determine whether the label is fixed in the desired position. In order to do this, some synchronizing means has, in the past, been necessary so as to provide a signal indicative of the position of the bottle as it moves along the conveyor belt. Then, with successive vertical readings from the detectors, an indication of the orientation of the label on the bottle may be obtained. For example, a plurality of photo cells may be spaced in a horizontal direction beside the belt and, as the bottle eclipses successive photo cells, their outputs can be used to produce horizontal position indications as the bottle moves past them and the system will thus have an indication of where the bottle is at any particular moment. Alternately, the conveyor belt may be controlled to move at a predetermined rate so that the position of the bottle is known from its initial placement on the conveyor belt and by timing the speed of the conveyor belt as it moves past the detector array.

Several difficulties have been encountered with the prior art systems. For example, with the speed control systems, the bottle may slip with respect to the conveyor belt and thus throw all of the measurements off. With the photo cell systems, different size bottles require that the photo electric detectors be repositioned for each different size in order to now provide the proper position signals.

SUMMARY OF THE INVENTION

The present invention overcomes the problems of the prior art by providing a detector array not only in a single direction such as vertical, but also in a second direction such as horizontal. The terms "vertical" and "horizontal" are relative terms with respect to any application since the height measurement of the bottle need not always be vertical, nor need the position be measured in a horizontal direction. All that is actually needed is that the first and second directions through which the measurements are to be taken be coordinated in a known manner with respect to the direction of movement of the bottle. By utilizing the "horizontal" detectors to determine the exact location of the bottle in the direction of movement of the bottle and then using the outputs of selected ones of the horizontal detectors to trigger the system so that the outputs from the "vertical" detectors will give the vertical dimensions of the bottle and the label at the desired selected locations, regardless of possible bottle slippage and the label orientation can be accurately determined by a properly programmed computer. If other bottles with other shapes are encountered, the computer can be programmed to detect and account for the changes in dimensions and orientations and perhaps different selected outputs used to trigger desired readings, the result is an accurate output for a large variety of applications without changing detector positions or checking for slippage.

In a co-pending application Ser. No. 121,696 filed Nov. 16, 1987, in the name of Norman L. Stauffer and assigned to the assignee of the present invention, a linear array mirror system is disclosed in which a single linear array of detectors are arranged with respect to a plurality of mirrors so that measurements can be taken in more than one direction at the same time. Such an array of detectors is ideal for application in the present invention although it should be understood that two separate detector arrays located at a desired angle with respect to each other may also be utilized. Also, certain detectors of a two-dimensional array may be utilized.

DETAILED DESCRIPTION OF THE PREFERRED EMBODIMENTS

For purposes of description herein, the invention will be described in connection with the determining of the correctness of a label on a bottle, but it should be understood that many other applications are possible using the inventive concepts described herein.

Figure 1:
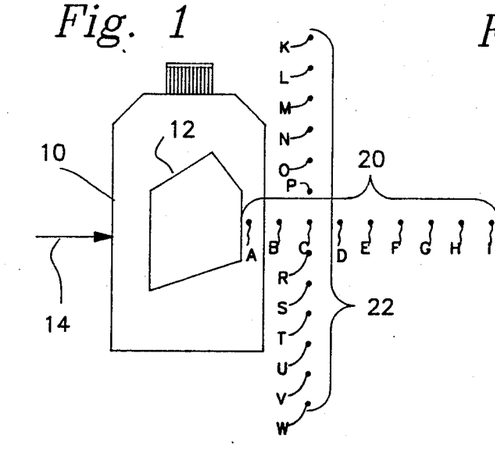
FIG. 1 through 6 show the image of a bottle with label attached thereto moving to the right through a pair of mutually orthogonal detector arrays.

In FIGS. 1-6 the image of bottle 10 having a label 12 affixed thereto is seen moving to the right as shown by arrow 14. The image of bottle 10 may be produced by an optical system similar to that shown in the above-mentioned co-pending application or by other common means and need not be further described here. It is noted that the bottle and label are both of irregular shape and that the label is placed on the bottle in a skew position. This is the presumed desired position for the label which the present invention is intended to assure. Also shown in FIG. 1 is a first linear array of detectors 20 identified by letters A-I which are shown equally spaced along a horizontal axis parallel to the direction of movement 14 of bottle 10.

A second linear array of detectors 22 identified by letters K-W are shown equally spaced along a vertical axis perpendicular to the direction of movement 14 of bottle 10. It is noted that the center detector C is a part of both detector arrays, but if desired, the two arrays could be offset and a detector Q (not shown) used in the second array. It should be understood that the number of detectors in each array is a matter of choice and it is common to use 256 detectors in each of the arrays. Only a few detectors are shown herein to simplify the explanation. It should also be understood that while the directions shown in FIGS. 1-6 are perpendicular to each other and lie along the vertical and horizontal axes, such arrangement is arbitrary and the position of the two arrays may be chosen so as to lie at any angle with respect to each other for particular purposes with neither direction being "horizontal" or "vertical".

The detectors of each array may be of any standard variety, but in the preferred embodiment, CCD detectors are used and the output of each detector changes as it goes from sensing a background to sensing the image of bottle 10 and then again changes when sensing the image of label 12. Thus, the level of energy received by each detector is indicative of whether or not it is receiving radiation from the background, from the bottle, or from the label. This is desirable in order for the apparatus to be able to determine the position and extent of the bottle and label individually.

It should be noted that in FIG. 1 detector A in array 20 has just been eclipsed by the image of bottle 10 while all of the other detectors are receiving energy from the background. Accordingly, the output of detector A will change and, as will be described in connection with FIGS. 6 and 7, may operate to produce a signal which turns the rest of the detectors to an "on" or sensing condition, thus saving energy and allowing the system to be self-activated in contra distinction with the prior art which had to be separately synchronized for each object being sensed and remained constantly on.

Accordingly, in FIG. 1, the detector arrays 20 and 22 will be self-activated and, as the bottle and label move to the right as shown in FIGS. 2-6, the outputs of the detectors will change in a way which will be indicative of the position of the label and bottle with respect to the detector arrays.

Figure 2:
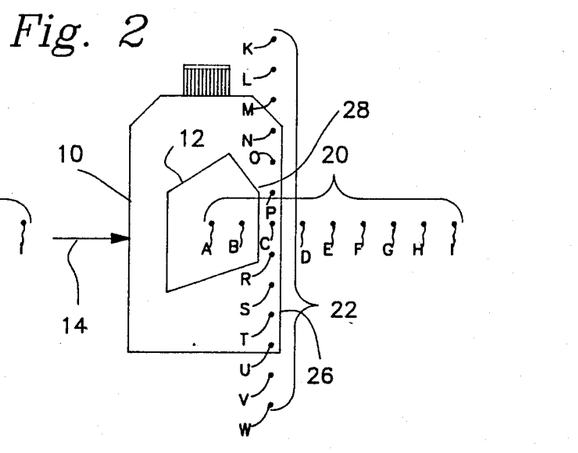

In FIG. 2, the image of bottle 10 has moved to the right far enough so that the leading edge 26 of bottle 10 has just passed detector C in array 20 and is thus eclipsing detectors N-U in array 22. The signal from detector C may be used to alert the system to the fact that the vertical dimension of bottle 1 may be measured. That is, an output from detector C may produce a "valid entry" signal as will be explained in connection with FIGS. 7 and 8. The height of bottle 10 at position C is determined from the fact that the 8 equally spaced detectors N-U have been eclipsed. Of course, equal spacing of the detectors, while most convenient, is not an absolute requirement for proper operation so long as the signal analyzing equipment can determine the extent of a dimension by the number of detectors which are eclipsed. A downstream computer, to be described hereinafter, receives the knowledge of the position of the bottle by virtue of the difference in output between detectors C and D in array 20 and receives a height indication by virtue of the difference in output between detectors M and N and detectors U and V of array 22, i.e., 8 units. Accordingly, the computer will begin to know what type of bottle is being encountered and, as more information is gathered, will be able to determine whether or not this or some other kind of bottle or other object is being encountered.

It should also be noted that, in FIG. 2, detectors A and B are now eclipsed by the image of label 12 and, accordingly, the computer will know that the label 12 has been encountered and that its leading edge 28 lies between positions B and C. This provides the computer with information as to the starting position of label 12 which it may then use to determine whether or not the starting position is correct or not.

Figure 3:
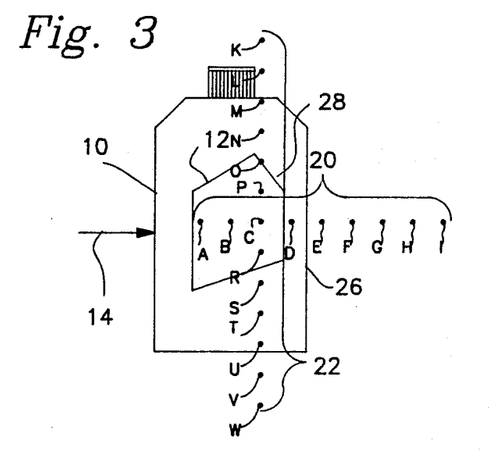

In FIG. 3, bottle image 10 has moved to a position where leading edge 26 has moved between detectors D and E of array 20 and the leading edge 28 of label 12 has moved to a position between detectors C and D of array 20 and is thus eclipsing detectors P-R in array 22. It should also be noted that detector M in array 22 is now eclipsed by bottle 10 and accordingly, if the output of detector D is used to trigger a "valid entry" reading, the computer will know that at the position between detectors D and E of array 20, the bottle has a height equal to between 8 and 9 units and that label 12 has a height equal to between 3 and 4 units. Accordingly, the computer may use this to determine the orientation of the label 12 with respect to bottle 10 and has more information to determine whether the bottle is the correct one being observed.

Figure 4:
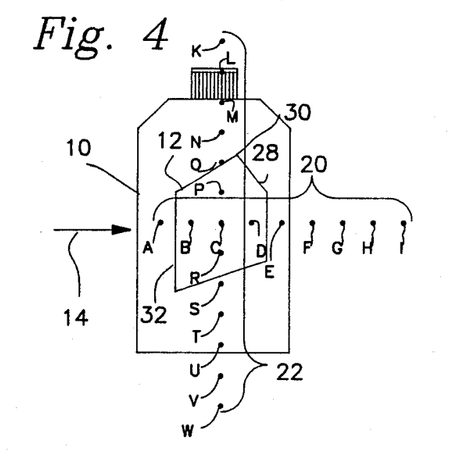

In FIG. 4, the bottle has moved to a generally central position with respect to array 22 and the leading edge 26 is now eclipsing detector E while detectors L-U are being eclipsed by bottle 10 and detectors O-R are still being eclipsed by label 12. Accordingly, if the output of detector E is used to trigger a "valid entry" reading, the computer will know the position of peak 30 of label 12 in its movement to the right. This too will provide information to the computer determining the correct position of the label and the identification of the label and bottle. It should also be noted that detector A is no longer being eclipsed by label 12 which provides the computer with information as to the position of the trailing edge 32 of label 12. Combining this information with the position of the leading edge 28 of label 12, the computer will now the horizontal dimension of label 12 as is desired.

Figure 5:
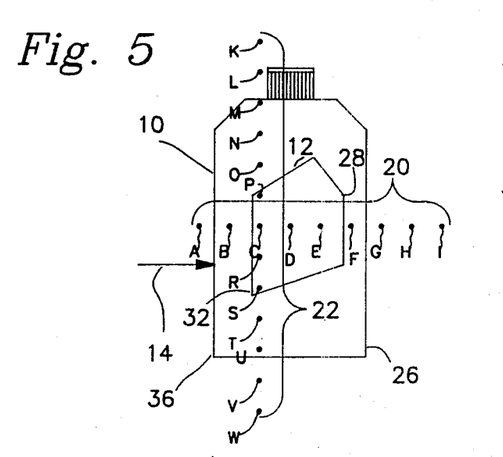

In FIG. 5, the image of bottle 10 has now moved to where the leading edge 26 of bottle 10 lies between detectors F and G of array 20. It should also be noted that the trailing edge 36 of bottle 10 has just passed beyond detector A of array 20 and, accordingly, if the output of detector F is used to trigger a "valid entry" reading, the computer will know that the horizontal dimension of bottle 10 is between 5 and 6 units. This then can be used as further evidence of the identity of the bottle and the correct positioning of label 12. It will be noted that in the position shown in FIG. 5, detectors P-S are now eclipsed by label 12 and, accordingly, the computer will know that the vertical dimension of label 12 has changed downwardly to provide desired information as to the label shape.

Figure 6:
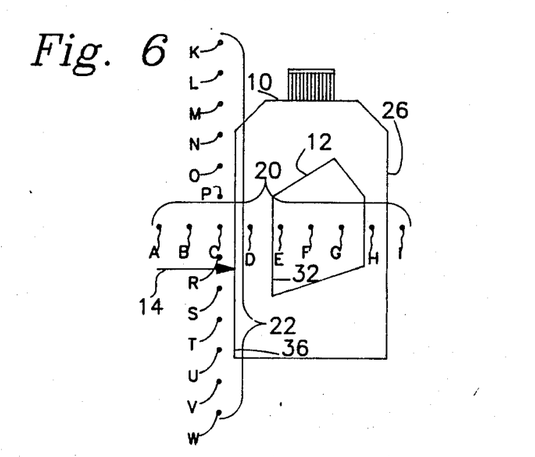

Finally, in FIG. 6, the image of bottle 10 has now moved to a position where it has left the entire vertical array 22 and now eclipses detectors D-H in array 20. All of the information needed to determine the size and shape of bottle 10 has been fed to the computer since the detectors in the vertical array 22 have been producing outputs which vary with the vertical dimension as it moves along the direction of arrow 14. Furthermore, the horizontal information concerning the size of bottle 10 and label 12 has been determined in a similar fashion. Thus it can be determined from a programming of a computer that label 12 is in fact in the correct position on bottle 10 and that bottle 10 an label 12 are of a desired type.

At this point in the progression of bottle 10 along its path, it may be desirable to shut off the detector arrays 20 and 22 and, accordingly, the final detector I in array 20 which will shortly be eclipsed by bottle 10 may be used to shut off the system.

Figure 7:
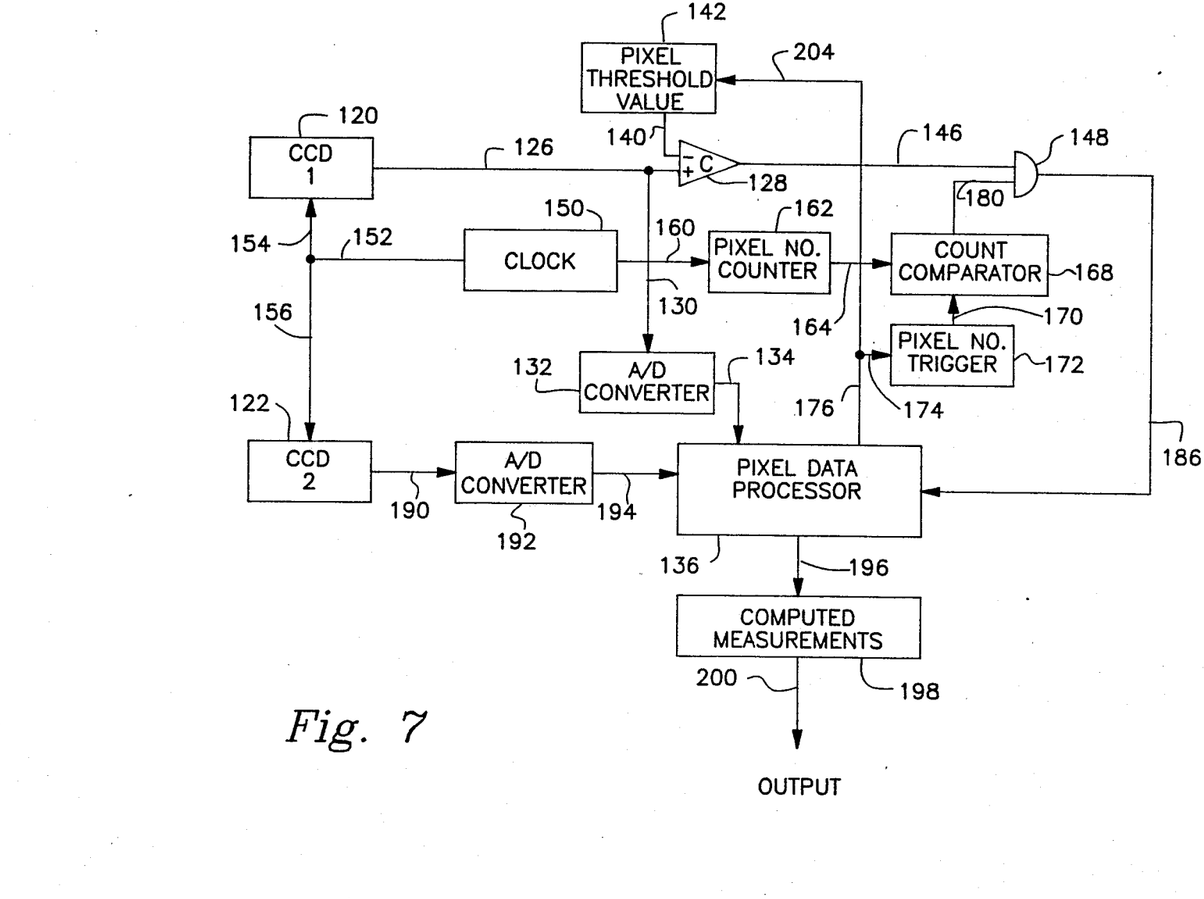
FIG. 7 shows a schematic block diagram of a system for utilizing the outputs of the detectors.

Referring now to FIG. 7, a schematic block diagram of the present invention is disclosed. In FIG. 7 the horizontal array of detectors 20 of FIGS. 1-6 is shown as a box 120 labelled "CCD1" and the vertical array of detector 22 of FIGS. 1-6 is shown as a box 122 labelled "CCD2". The output of the individual detectors or "pixels" in array 120 is produced in serial fashion on an output line 126 which is presented to the positive input terminal of a comparator 128 and also by a line 13 to an A/D converter 132 which produces a digital output signal on a line 134 to a pixel data processor 136.

The negative input terminal of comparator 128 is connected by a line 140 to an output of pixel threshold value generator 142. The purpose of pixel threshold value generator 142 is to provide an input to comparator 128 of magnitude indicative of the size of the signal above which the output of CCD array 120 must rise before comparator 128 produces an output on a line 146. For example, if the background radiation in the system being used has a certain value, the negative input of comparator 128 would be set to be somewhat above the background value so that while CCD array 120 was viewing only the background, there would be no output from comparator 28, but when the image of the bottle 10 of FIGS. 1-6 first comes into view by the CCD array 120, one or more of the detectors will produce an output greater than the background value and thus comparator 128 will produce an output on line 146 to the upper input of an AND gate 148. Of course, if the background was light and the bottle were dark, the reverse could be true, and the output from the CCD array 120 would be high when it was viewing background and drop to a low value when the image of the bottle was encountered. In any event, the output of comparator 128 will change and, in the present example, will increase to a high value when the image of the bottle comes into view. As the bottle moves from left to right in FIGS. 1-6, successive CCD elements or pixels A-I will produce the increased output and, accordingly, the AND gate 148 will first receive a single pulse from detector A and, later, receive a pulse from both pixels A and B, etc.

A clock 150 is shown in FIG. 7 operating through a line 152 and lines 154 and 156 to drive CCD arrays 120 and 122, respectively. A signal from clock 150 causes the output of the detectors in array 120 to appear on line 126 in periodic fashion. Clock 150 has a second output on a line 160 shown connected to a pixel number counter 162 whose purpose is to produce an output on a connection 164 continuously indicative of the pixel output from the CCD array 12. More particularly, the output of pixel number counter 162 on line 164 is presented to a count comparator device 168 to tell the count comparator device 168 which pixel is being outputted from the CCD array 120 at the present time. Count comparator 168 receives a second input over a line 170 from a pixel number trigger 172. Pixel number trigger 172 receives an input over a line 174 and a line 176 from the pixel data processor 136. The pixel data processor is programmed to tell the pixel number trigger 172 when it desires to have "valid data" received from the CCD arrays 120 and 122. Accordingly, pixel number trigger 172 may receive, for example, a signal over lines 176 and 174 indicating that when the bottle image of FIGS. 1-6 reaches the third position, i.e., pixel C, a "valid data" reading should be taken of both CCD array 120 and CCD array 122. Accordingly, pixel number trigger 172 provides a signal over line 170 to the count comparator 168 telling count comparator 168 to produce an output on a line 180 whenever the third pixel (pixel C) is producing an output on line 126, i.e., the situation seen in FIG. 2. Therefore, every time the interrogation of the pixels in CCD array 120 repeats, a positive pulse will appear on line 180 as the output of pixel C is emerging from CCD array 120. Of course, it should be understood that the actual number of individual CCD elements in the array is normally 256 and, accordingly, it might be pixel number 80 in a practical system that would be interrogated to determine when valid data should be taken.

In any event, when the image of the bottle reaches the position shown in FIG. 1, although a positive pulse may appear from pixel number A to comparator 128 which is higher than the background value as produced by the pixel threshold value generator 142, the pulse will be appearing at the upper input of AND gate 148 only at that point since pixel number C is still receiving background and, accordingly, the AND gate 148 will not receive simultaneous inputs. However, when the image of the bottle 10 passes the pixel number C in FIGS. 1-6, a positive value will occur from the output of comparator 128 and this, combined with the positive value on line 180 from count comparator 168, will produce an output pulse from AND gate 148 on a line 186. This pulse tells the pixel data processor 136 that the image of the bottle has reached the desired location and that the data being submitted by the arrays 120 and 122 is now "valid" and should be stored. Accordingly, the data from the CCD array 120 will pass along lines 126 and 130 through the A/D converter 132 and line 134 to the pixel data processor 136 where it will be stored. Likewise, the output from CCD array 122 appearing on a line 190 through and A/D converter 192 and a line 194 will also be stored. Accordingly, the pixel data processor 136 now has knoWledge of what the vertical array of detectors 22 are detecting when the position of the image is just past pixel number C as was the case in FIG. 2. Thus, the vertical data will be indicative that pixels N-U of FIG. 2 are receiving signals greater than the background while pixels C, B, and A of the horizontal array 120 are receiving signals greater than the background.

The pixel data processor 136 will now determine where the next "valid data" reading should be taken, for example, when pixel number D in the horizontal array 120 has just gone from background to bottle image as in FIG. 3. Accordingly, pixel data processor 136 will produce a signal on line 176 and 174 to the pixel number trigger box 172 to supply a signal on line 170 indicating that the fourth pixel (pixel D) should now be interrogated. Now, when the count comparator detects the fourth pixel from pixel number counter 162, a pulse will appear on line 180. As soon as the fourth pixel or pixel "D" is eclipsed by the image of bottle 10 as in FIG. 3, AND gate 148 will receive simultaneous inputs on lines 146 and 180 to produce a second "valid data" output on line 186 telling pixel data processor 136 that the desired situation has now been reached and it should store the outputs from the individual pixels of CCD arrays 120 and 122.

This process continues with the pixel data processor continually updating the pixel number trigger 172 to take readings at different positions in the travel of the bottle in the horizontal direction in FIGS. 1-6. This will continue until there is no longer any need for further data at which time the pixel data processor will reset the pixel number trigger 172 so that no output is received from the count comparator 168 during the following cycles. Meanwhile, the pixel data processor 136 will produce an output on a line 196 indicative of the stored values and will present them to a computed measurements box 198 which will cause the required calculations to be made to determine if the bottle and its label are in the proper position. More particularly, computed measurements box 198 will compare the signals generated by the pixels in arrays 120 and 122 with the desired information previously held in memory for that particular bottle/label arrangement and will produce an output on line 200 indicating "OK" if the bottle and label have met the proper specifications or will produce an output "NOT OK" if the bottle and label have ailed to meet the specifications. Computed measurements box 198 ma be a part of the pixel data processor 136 in a normal system.

When different situations with different backgrounds and different bottles or other objects are encountered, pixel data processor 136 may send a signal over lines 176 and 204 to the pixel threshold value generator 142 so that comparator 128 will now produce outputs indicative of the changed situation. Likewise, in such event, the output from the pixel data processor 136 on line 196 will tell the computed measurements device 198 which set of values in its memory should be compared with the next set of outputs therefrom.

Figure 8:
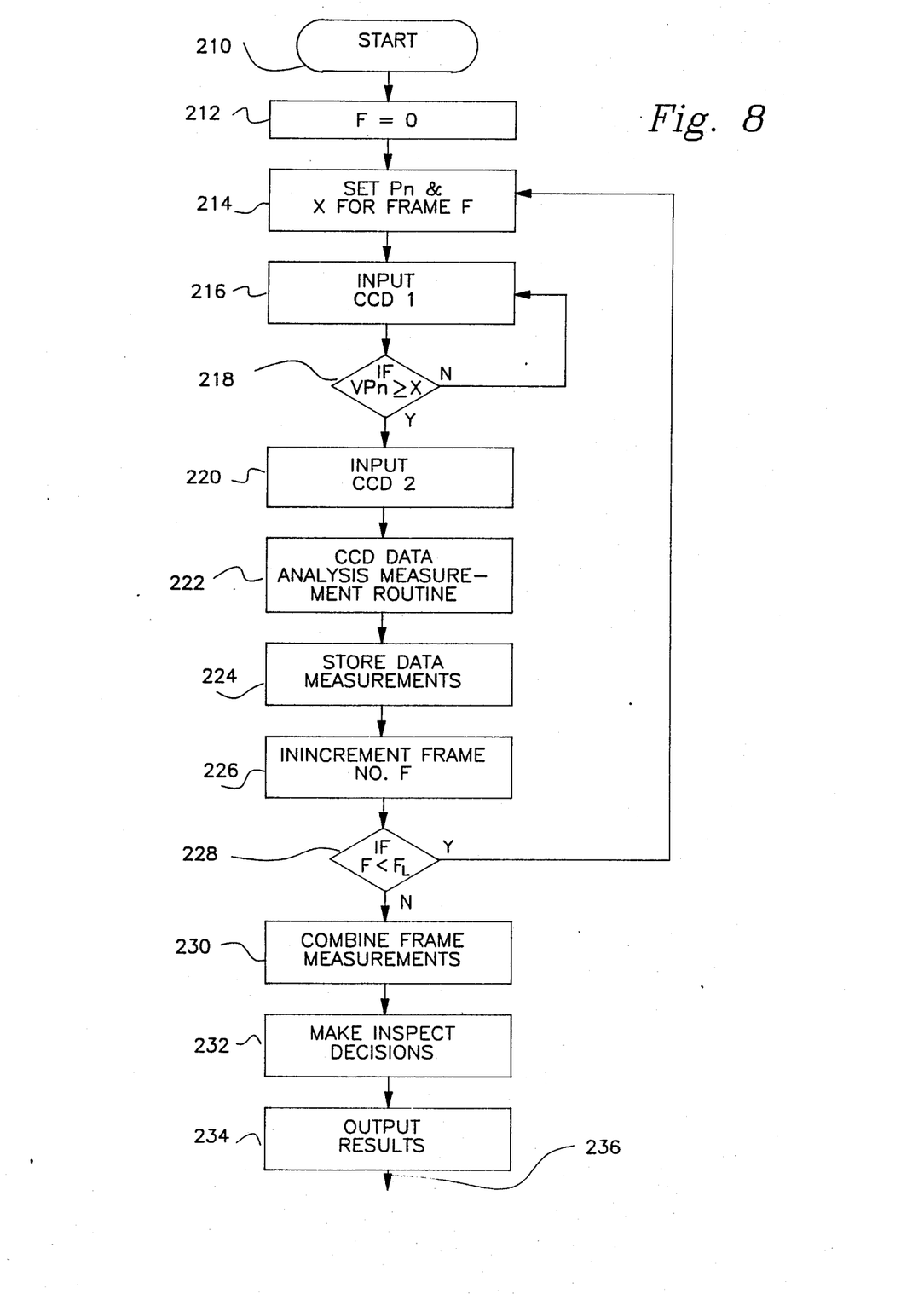
FIG. 8 shows a logic diagram for use by the computer in determining the proper orientation of a label with respect to a bottle.

FIG. 8 shows the logic diagram for programming the computer to perform the functions described above. A box 210 labelled "START" produces a signal to a box 212 labelled "F=0" indicating that at the start, frame number 0 is to be considered. The output of box 212 is therefore presented to a box 214 labelled "set $P_n$ & X for frame F" which sets the pixel number corresponding to frame 0 and also sets the threshold value for that pixel to exceed in order to produce an output. More particularly, in the example given, box 214 would determine that the third pixel (pixel C) is to be interrogated for frame 0 and that for it to be a "valid data" signal, it must exceed the value which is presented on line 204 to the pixel threshold value generator 142 of FIG. 7.

Box 216 then checks the input from CCD1 and a diamond-shaped box 218 asks the question whether or not the voltage of the predetermined pixel, $V_pN$, is greater than the threshold value X or not. If "no", a signal is then presented back to the box 216 to check the output of CCD1 again. As soon as the value of voltage $V_pN$ does exceed the value X, then a "yes" signal is presented from box 218 to box 220 labelled input CCD2 calling for the release and storage of information from the CCD1 and CCD2 to the pixel data processor 136 of FIG. 7. The information is therefore presented to a data analysis and measurement routine box 222 which determines what the data measurements are (i.e., the width of the bottle, the position of the label, the height of the bottle, etc.) This information is then presented to the store data measurements box 224 and when this is accomplished, the output of store data measurement box 224 is presented to an increment frame number box 226 which will then require that the next frame, i.e., F=1, be interrogated and this signal is sent to a decision box 228 where it is determined whether or not the present frame being interrogated is less than all of the frames that need to be interrogated. If this is "yes" and F is less than all of the frames, then a signal is sent back up to box number 214 which sets the pixel number and threshold value for the next frame, i.e., frame number 1. This will continue until all the frames have been interrogated at which time the output from decision box 228 will be "no" which will be presented to a combined frame measurements box 230 which will look at all of the values that have been stored at the various frame readings and will provide a signal indicative thereof to a make inspection decisions box 232 where the frame measurements are compared with the desired frame measurements to produce an output to a box 234 indicative of whether or not the bottle and the label have met the required measurements. The final output from output results box 234 is presented on a line 236 for the operator or some decision-making machine to determine whether the bottle under examination is satisfactory or not.

It is therefore seen that I have provided a system utilizing two arrays of detectors placed at appropriate angles with respect to each other which can detect and determine certain desired characteristics of objects being observed. Many other arrangements than those shown in the preferred embodiments will be obvious to those who are skilled in the art. For example, while I have shown the invention for use in determining the position of a bottle and its label, many other characteristics such as size, orientation, defects and relative position may also be detected and analyzed using the principle of the present invention. Also, while two linear arrays have been shown, the system may utilize more than two arrays and even a full matrix array. Accordingly I do not wish to be limited to the specific disclosures used in connection with the above description. I intend only to be limited by the following claims.

The embodiments of the invention in which an exclusive property or right is claimed are defined as follows:

1. In a system for use with a detector array wherein an image of a remote object moves with respect to the array, the improvement comprising:
   a first plurality of radiation responsive detectors in the array, each detector of the first plurality operable to produce an output indicative of its detection of the image of the object;
   a second plurality of radiation responsive detectors in the array, each detector of the second plurality operable t produce an output indicative of its detection of the image of the object; and
   responsive means connected to receive the outputs of the first and second plurality of detectors, said responsive means detecting the output of at least one preselected detector in the first plurality of detectors to trigger the detectors of the second plurality of detectors to produce a valid data output.

2. Apparatus according to claim 1 further including analyzing means connected to receive the outputs of the second plurality of detectors when the output of the preselected detector changes.

3. Apparatus according to claim 2 wherein the first plurality of detectors is positioned along a first direction and the image of the object moves in the first direction.

4. Apparatus according to claim 3 wherein the second plurality of detectors is positioned along a second direction to provide information to the analyzing means indicative of a characteristic of the object in the second direction when the image of the object is in a position determined by the preselected detector.

5. Apparatus according to claim 4 wherein the first plurality of detectors includes at least several preselected detectors, the outputs of which change when the image of the object passes thereby and each such output triggers valid data outputs from the second plurality of detectors to be received by the analyzing means.

6. Apparatus according to claim 1 wherein the array is a full matrix array.

7. Apparatus according to claim 5 wherein the array is a full matrix array.

8. Apparatus according to claim 5 wherein the analyzing means includes memory means to store the values of the valid data outputs of the detectors in the second plurality of detectors.

9. Apparatus according to claim 5 further including reference means to store predetermined values and comparing means for comparing the predetermined values with the values of the valid data outputs of the detectors in the second plurality of detectors.

10. Apparatus according to claim 9 wherein the object is one of a plurality of objects being observed and the apparatus operates to determine the extent of each object in the second direction.

11. Apparatus for use with an object whose radiation transmitting properties are different than its background, the object having an image that moves with respect to an array of radiation responsive detectors and the object having predetermined characteristics to be measured along first and second directions respectively, comprising:
a first plurality of radiation responsive detectors spaced along the first direction, each detector in the first plurality operable to produce an output upon a change of radiation received thereby;
a second plurality of radiation responsive detectors spaced along the second direction, each detector of the second plurality operable to produce an output upon a change of radiation received thereby at least one of the detectors in the first plurality of detectors operating at a preselected position, to activate the second plurality of detectors; and
responsive means receiving the outputs of the first and second plurality of detectors and operable to produce a valid data output indicative of the predetermined characteristic at the preselected position of the object along the first direction.

12. Apparatus according to claim 11 wherein the first and second plurality of detectors are equally spaced so that the number of detectors receiving radiation from the object is indicative of the extent of first and second dimensions of the object, respectively.

13. Apparatus according to claim 11 further including motive means to move the object in the first direction.

14. Apparatus according to claim 11 wherein the predetermined characteristic is the dimensions of an object in the first and second directions.

15. Apparatus according to claim 11 wherein the responsive means includes a computer which has a memory for storing the outputs of the first and second plurality of detectors at preselected positions and comparing the valid data outputs with prestored reference values to determine a satisfactory comparison.

16. Apparatus according to claim 15 wherein the resultant output provides an "OK" and "NOT OK" comparison signal.

17. The method of detecting predetermined characteristics of an object comprising the steps of
A. producing an image of the object on an array of radiation responsive detectors each operable to produce an output indicative of radiation received thereby, the array having a first plurality of detectors spaced in a first direction and a second plurality of detectors spaced in a second direction;
B. scanning the first plurality to determine preselected positions of the image and to determine the characteristics of the object in the first direction; and
C. scanning the second plurality to determine the characteristic of the object in the second direction at the preselected positions of the image in the first direction as determined in step B.

18. The method of claim 17 further including the step of:
D. receiving the outputs of the detectors as valid data outputs at the preselected positions; and
E. comparing the valid data outputs of the first and second pluralities with predetermined reference values.

19. The method of claim 17 wherein the first and second directions are substantially perpendicular.

20. The method of claim 17 wherein the image of the object is moved in the first direction past the array.

21. The method of claim 18 wherein step E includes:
E' storing valid data outputs of the detectors for each scan in a computer memory; and
E" comparing the stored values with desired values stored in the computer memory.

22. The method of claim 21 wherein one output from the first plurality indicative of the image having reached a first position in its movement across the array operates to cause the scanning of the detectors to be stored for step E'.

23. Apparatus for use with an object whose radiation transmitting properties are different than its background, the object having an image that moves with respect to an array of radiation responsive detectors and the object having predetermined characteristics to be measured along first and second directions respectively, comprising:
a first plurality of radiation responsive detectors spaced in a first direction, each detector in the first plurality operable to produce an output upon a change of radiation received thereby;
a second plurality of radiation responsive detectors spaced in a second direction, each detector of the second plurality operable to produce an output upon a change of radiation received thereby; programmable means connected to the first plurality of detectors to produce a resultant signal when the output from a preselected detector is produced as an indication that the image is in a predetermined position, said programmable means operating to receive the outputs of at least one of the first and second pluralities of detectors as valid data upon the occurrence of a resultant signal and to compare the valid data with predetermined values as an indication of the characteristics of the object along one of the first and second directions.

24. Apparatus according to claim 23 wherein the programmable means operates to receive the outputs of both the first and second pluralities of detectors as valid data upon the occurrence of a resultant signal and to compare the valid data with predetermined values as an indication of the characteristics of the object along both the first and second direction.

25. Apparatus according to claim 24 wherein the programmable means including memory means to store the valid data and, as programmed, to store the predetermined values.

* * * * *

UNITED STATES PATENT AND TRADEMARK OFFICE
CERTIFICATE OF CORRECTION

PATENT NO. : 4,912,337

DATED : March 27, 1990

INVENTOR(S) : Dennis J. Wilwerding

It is certified that error appears in the above-identified patent and that said Letters Patent is hereby corrected as shown below:

Claim 1, line 60, delete "t" and insert --to--.

Claim 15, line 7, insert --the-- before "preselected".

Signed and Sealed this

Twenty-fifth Day of June, 1991

Attest:

HARRY F. MANBECK, JR.

Attesting Officer

Commissioner of Patents and Trademarks